Patented Apr. 4, 1944

2,345,946

UNITED STATES PATENT OFFICE 2,345,946

PREPARATION OF POLYVINYL ACETAL RESINS

Sidney C. Overbaugh, Arlington, N. J., assignor to E. I. du Pont de Nemours & Company, Wilmington, Del., a corporation of Delaware No Drawing. Application February 11, 1942, Serial No. 430,436

13 Claims. (Cl. 260—73)

This invention relates to the preparation of polyvinyl acetal resins and, particularly, to improvements in the manufacture of those prepared from aliphatic aldehydes having a limited solubility in water.

It is well known that the products of hydrolysis of polyvinyl esters will react with aldehydes to form polyvinyl acetal resins. The characteristics of the resulting resins will depend, inter alia, upon the extent to which the initial polyvinyl ester has been hydrolyzed, upon the extent to which the resulting hydroxyl groups have been reacted with aldehyde, and upon the choice of the aldeyde used. In general the reaction of condensation is not complete and the polyvinyl acetal resin contains in its macromolecule both acetal groups and free hydroxyl groups, and, frequently, also unaltered ester groups. To meet the requirements of specific uses best, it is necessary to control the percentages of polyvinyl acetal and of polyvinyl alcohol in the final resin. Thus, if it is desired that the resin be soluble in a variety of organic solvents, the acetal content must be carried beyond a certain minimum since resins containing more than the corresponding proportion of unaltered polyvinyl alcohol will be insoluble in the desired solvents. If it be desired that the resin be substantially unaffected by water, a high content of acetal and a relatively low content of free hydroxyl groups are required.

The procedures heretofore most favored for the commercial manufacture of polyvinyl acetal resins involve the use of organic solvents, and are of two general types. In the so-called one-stage procedure, a polyvinyl ester is acted upon by an aldehyde in the presence of an acid catalyst and a hydrolyzing agent, and the hydrolysis of the ester and the formation of acetal proceed side by side. Sufficient of a suitable solvent is provided to keep the reaction product in solution throughout its formation. In the so-called two-stage procedure, a polyvinyl ester is hydrolyzed, either partially or completely, and the resulting product is condensed with an aldehyde in a separate subsequent step; the hydrolysis product may or may not be isolated before being reacted with aldehyde. In this procedure also sufficient suitable solvent is present so that at the close of the reaction the polyvinyl acetal resin is in solution. In either case, in order to obtain the product in a useful form, it must be separated from solution by precipitation, and subsequently purified.

It is known, also, that the condensation of polyvinyl alcohol with aldehyde may be carried out in an aqueous medium, by introducing an aldehyde and an acid catalyst into an aqueous solution of the polyvinyl alcohol. Obviously, it is advantageous to conduct the manufacture thus without the use of organic solvent, but in actual practice condensation in aqueous medium has met with difficulties. If the reaction mixture is heated, the reaction of condensation proceeds only part way before a half-formed resin separates from solution in a coherent spongy mass, and the physical condition of this precipitate makes it difficult to effect the continuance of the reaction to the desired end-point, and also renders the purification of the final resin very laborious and difficult. If, on the other hand, the reaction mixture is kept at a temperature so low that a resinous product is obtained in a desirably finely divided form, the reaction between polyvinyl alcohol and aldehyde does not proceed far enough to meet ordinary commercial requirements; the proportion of unaltered polyvinyl alcohol in the product is distinctly higher than the maximum which can be tolerated for most commercial purposes, and the resin is unsatisfactory in its solubilities and undesirably sensitive to water.

It is an object of the present invention to provide a commercially feasible process for the manufacture of polyvinyl acetal resins of commercially useful types without the use of organic solvent in connection with the reaction of condensation. A further object is to render unnecessary the difficult step of precipitating the finished resin from solution and, instead, to provide a method by which the resin is precipitated, in the course of its formation, in such physical form as to be conducive to the desired completion of the reaction of condensation, and to the subsequent purification of the resin. A further object is to effect economy in the use of aldehyde in the reaction of condensation. A secondary object is to accelerate the reaction of condensation. Other objects will be apparent from the description of the invention given hereinafter.

The above objects are accomplished according to the present invention by employing, in the preparation of a polyvinyl acetal resin, the step comprising agitating in the presence of a dispersing agent and an acid catalyst a mixture comprising a water solution of polyvinyl alcohol and a liquid aldehyde of low solubility in water. More specifically, the present invention is carried out by adding, under vigorous agitation, the aldehyde to a water solution of the polyvinyl alcohol, the solution containing the acid catalyst and the dispersing agent, and, thereafter, continuing the agitation and heating the resulting mixture to 50° C.–75° C. and maintaining this temperature and the agitation until the condensation reaction has reached the desired endpoint.

Under the conditions thus prescribed, i. e., agitation in the presence of a dispersing agent, a water-insoluble intermediate product, resulting from a reaction of part of the aldehyde with the hydrolysis product, separates out in the form of non-coherent particles of small size. Further reaction of aldehyde with this intermediate product leads to the formation of the final polyvinyl acetal resin, which retains the desirable finely-divided form of the initial precipitate, and is correspondingly easily separated from the batch, and thereafter easily washed and stabilized.

For the sake of simplicity the term "polyvinyl alcohol" is used hereinafter in the specification to include those products of the hydrolysis of a polyvinyl ester (usually polyvinyl acetate) which are suitable for the production of resins by condensation with aldehyde; the term will thus include not only the product of a complete hydrolysis, but also products of incomplete hydrolysis which are more likely to be available, including those for which hydrolysis has deliberately been stopped short of completion. From the standpoint of operativeness in the present invention these products are equivalent but, of course, the acetal resins made from them will differ among themselves in residual content of polyvinyl ester, and so also in certain of their properties. Polyvinyl alcohols may contain, in their macromolecules, residues of unhydrolyzed vinyl ester in amounts up to as much as 30%, by weight, and still be useful in the formation of polyvinyl acetal resins although amounts of the order of 0.5% to 6% are more usual, particularly if the resin formed is to be used in safety-glass.

In carrying out the process of this invention the polyvinyl alcohol has preferably a viscosity of not greater than 70 centipoises in a 5% aqueous solution at 25° C., though higher polymers may be used if desired, with, however, some sacrifice in the solubility of the product. The polyvinyl alcohol is dissolved by mixing with cold water and heating and stirring until the mixture becomes perfectly homogeneous. It is desirable to heat to about 80° C., at which temperature a uniform dispersion is quickly produced. If desired, the acid catalyst and the dispersing agent may be added before or during the heating, or they may be added after the solution has been cooled to the temperature at which it is desired to start the condensation.

Ordinarily it is quite feasible to use polyvinyl alcohol while wet with residues of an organic solvent which has been used in its preparation, but the amount of such organic solvent to be tolerated in the essentially aqueous medium of the process of the present invention will be limited by its tendency to cause undesired agglomeration of the precipitated condensation product. Its presence thus tends to offset the dispersing effect of the dispersing agent used, and in those cases in which it may be convenient to permit residues of organic solvent to enter the reaction batch, it may be found necessary to provide an appropriately greater amount of dispersing agent than would otherwise be used, or to operate at lower temperatures than would otherwise be selected.

The maximum amount of organic solvent which can be tolerated is of the order of 10% to 15% of the water. Thus 11% of methanol has been found unobjectionable, while 16% has caused coherence of the precipitate. Acetic acid is tolerated in slightly higher concentration than this.

The concentration of the polyvinyl alcohol in the aqueous reaction batch may vary within wide limits. Solutions of 8% to 13% have been used with satisfactory results. The lower concentrations are advisable when polyvinyl alcohol of low viscosity is used in the reaction, because of the greater tendency of the resulting product of condensation to agglomerate.

For reasons not thoroughly understood, the present invention is not applicable in the reaction of polyvinyl alcohol with those aldehydes which are readily miscible with water such as formaldehyde and acetaldehyde. The invention relates to the use of normally liquid aldehydes of low solubility in water such as the aliphatic aldehydes containing from three to five carbon atoms, inclusive, including propionaldehyde (solubility, 20 grams in 100 cc. of water at 20° C.), butyraldehyde (solubility, 4 grams in 100 cc. of water at 20° C.), isobutyraldehyde (solubility, 11 grams in 100 cc. of water at 20° C.), and valeraldehyde and isovaleraldehyde. Other normally liquid aldehydes of no greater solubility in water than propionaldehyde are suitable.

The proportion of aldehyde added to the polyvinyl alcohol will depend primarily upon the polyvinyl acetal resin desired but, in general, the proportion of aldehyde will be approximately, but slightly in excess of, that which is theoretically required to effect condensation with the desired percentage of hydroxyl groups of the polyvinyl alcohol.

To prevent troublesome agglomeration of the polyvinyl acetal resin precipitated, the reaction mixture at the start of the process during the period the resin is being precipitated, is maintained at a relatively low temperature not in excess of 50° C. and usually between 20° C. and 30° C., although even lower temperatures may be employed. At these relatively low temperatures and with adequate agitation the initially formed polyvinyl acetal resin will precipitate in a finely divided state and, while a relatively low temperature is still maintained, remain in this state even in the absence of a dispersing agent. On the other hand, troublesome agglomeration of the initially finely divided resin may occur in the first few minutes after precipitation even in the presence of dispersing agents if a higher temperature is used.

Accordingly, it is not essential that a dispersing agent be present when the polyvinyl acetal resin is precipitating and the reaction mixture is at a relatively low temperature but the presence of a dispersing agent in the reaction mixture at this stage is insurance against excessive agglomeration of the precipitated resin particles and it is usually more convenient to add the dispersing agent, which will be needed later in operating according to the present invention, initially to the reaction mixture. If the polyvinyl acetal resin is to be precipitated from the reaction mixture at temperatures above 30° C., it is advisable to have the dispersing agent present from the start.

It has been discovered that after a short period following the admixture of the reactants and precipitation of the polyvinyl acetal resin in finely divided form, the tendency of the particles to agglomerate gradually decreases and that, with continued agitation of the reaction mixture and with certain dispersing agents present, the temperature of the reaction mixture may be gradually raised to an eventual temperature of 50° C.–75° C. without danger of troublesome agglomeration of the particles of precipitated resin. In this way is provided a practical method of preparing polyvinyl acetal resins in an aqueous medium because the precipitated resin is kept in a workable form at elevated temperatures practically necessary to cause the reaction of condensation to go to completion, even though such temperatures are in proximity to the softening points of the resins being formed.

In carrying out the present invention the polyvinyl acetal resin is precipitated in extremely finely divided form in the reaction mixture which is being agitated throughout the precipitation period. It is not necessary, or even particularly desirable, that these very minute particles of precipitated resin should be kept from agglomerating with each other entirely; in the present process they do agglomerate to a certain extent to form composite particles of considerably larger size. What is necessary to prevent and is prevented by this procedure is the excessive agglomeration of the resin particles to the point where it is practically impossible to effect the continuation of the reaction of condensation to the desired end-point and, also, where it is exceedingly difficult to purify the resin thereafter.

The effective action of specific dispersing agents, in connection with continued agitation of the reaction mixture, in keeping the polyvinyl acetal resin from agglomerating excessively, can only be determined accurately by actual trial as some dispersing agents are unaccountably much less effective than others. A preferred disbursing agent for use in the present process is gelatine which in combination with the agitation of the reaction mixture results in the precipitated resin particles agglomerating into small composite particles of great uniformity of size. Another neutral substance adapted for use as a dispersing agent in the present process is methyl cellulose. A third, and not preferred dispersing agent, is potato starch.

Other dispersing agents suitable for use in this invention include the alkali metal salts of monoalkyl sulfuric acid esters such as "Duponal" ME which is the sodium sulphate of a mixture of normal primary aliphatic alcohols with lauryl alcohol predominating and containing lesser proportions of myristyl, stearyl and decyl alcohols, and "Avirol" L–142 which is the sodium salt of a mixture of cetyl and stearyl sulphates. Also, the long-chain sulphonic acids and their alkali metal salts may be used satisfactorily as dispersing agents, for example, "Alkanol" SA which is a tri-isopropyl beta-naphthalene sulphonic acid. Other operative dispersing agents include "Tergitol" 7 which is a secondary alcohol sulphate of seventeen carbon atoms.

These substances act in a vital way to prevent coagulation of the resin particles, and enable the reaction mixture to be heated to cause the reaction to go to completion. By this method almost any desired degree of acetalization may be attained, depending on the proportion of aldehyde to polyvinyl alcohol used. Although the particle size of the resin being formed may become somewhat coarser as the reaction proceeds, the presence of the dispersing agent insures that the coarser particles, i. e., agglomerations of the initial fine particles, are very loosely bound together, and thus the completion of the reaction, and the subsequent washing of the resin, are not in any way hindered.

The optimum amount of dispersing agent to prevent troublesome agglomeration of the resin particles for any particular set of conditions will ordinarily be determined by actual trial and this optimum amount will, obviously, vary depending upon the effectiveness of the dispersing agent selected. In general, with any effective dispersing agent, the amount employed will be in the approximate range of 0.2% to 1.0% by weight of the polyvinyl alcohol present.

Certain of the dispersing agents which are operative as such have been found to serve also to accelerate the reaction of condensation. In general, however, the amount of such dispersing agents required to effect useful acceleration is rather greater than that required for satisfactory control of the character and particle-size of the precipitate. Through this accelerating action the use of these dispersing agents achieves the secondary object of the invention.

This accelerating effect is possessed by "Duponol" ME to a marked degree and depends on the presence of the dispersing agent in certain minimum amounts. Amounts of 3% or more, based on the polyvinyl alcohol originally present, exert this effect to a desirable degree. If only 1% or less is used, the particle size may be satisfactorily controlled, but the reaction proceeds about as it would in the presence of gelatine or some other dispersing agent lacking in this accelerating effect. Accelerating influences, less marked than that of "Duponol" ME, are exerted by "Avirol" L–142 and "Alkanol" SA and by "Tergitol" 7. Gelatine, although having no accelerating effect, may be used effectively in combination with one of these dispersing agents having an accelerating effect, thereby obtaining the superior control of the size of the resin particles afforded by the use of gelatine.

As catalyst in the condensation a strong mineral acid such as sulfuric is satisfactory. Sulphonic acids also have been found to give good results. Although the amount of catalyst used may be varied within wide limits, the use of mineral acid in amount between 2% and 4% by weight of the polyvinyl alcohol will ordinarily be satisfactory.

The reaction is carried out by adding an aldehyde to the polyvinyl alcohol solution in the presence of the catalyst and, normally, also the dispersing agent, with vigorous agitation. In a few seconds or minutes from the addition of the aldehyde the mixture becomes very thick, and shortly thereafter "breaks," with the separation of a finely divided resinous condensation product. The slurry is stirred for a few minutes without application of heat and is usually then gradually warmed, to cause the reaction to go to completion. At the end of the reaction the product is cooled, filtered and washed, without the necessity of special precipitation procedures.

The temperature at the start of the reaction must be selected below that which will promote agglomeration of the particles of precipitate.

Consideration must be given, therefore, to the viscosity and concentration of the polyvinyl alcohol and to the concentration of dispersing agent. The higher the viscosity of the polyvinyl alcohol, the lower its concentration, and the higher the concentration and effectiveness of the dispersing agent, the higher may the temperature be, and vice versa. The temperature of the initial mixture will usually be selected between 20° C. and 50° C., and preferably between 20° C. and 30° C.

As the reaction proceeds, the tendency of the precipitate to agglomerate becomes gradually less, and, with the dispersing agent present, the temperature will ordinarily be correspondingly raised gradually, reaching 50° C. to 75° at the close of the reaction.

Polyvinyl acetal resins covering a wide range of hydroxyl content may be prepared by the method of the invention. The solubility in organic solvents changes with the content of polyvinyl alcohol, which is determined by acetylation. A sample, of one gram, is heated to 100° C. for two hours with 25 cc. of a solution of acetic anhydride in pyridine, 12% by volume. The excess of anhydride is determined and compared with a blank.

The following examples illustrate specific embodiments of the invention. The polyvinyl alcohols used in the examples were prepared from polyvinyl acetate, and, except where otherwise stated, contain from 0.5% to 2.0% of unhydrolyzed polyvinyl acetate. The polyvinyl alcohols designated "high-viscosity" were made from polyvinyl acetate having a viscosity between 50 and 60 centipoises as determined at 25° C. upon solutions of five grams in 100 cc. of dioxane. Those designated "medium-viscosity" were made from polyvinyl acetate having a viscosity of 11 to 12 centipoises. All proportions are given by weight unless otherwise stated and agitation of the reaction mixture is continued throughout the reaction period in each instance whether so stated in the example or not.

EXAMPLE 1

To a hot solution of 281 parts of high-viscosity polyvinyl alcohol in 1710 parts of water and 169 parts of methanol, was added 7 parts of sulfuric acid and 1.4 parts of gelatine. The solution was cooled to 25° C. and 222.5 parts of butyraldehyde were added with vigorous agitation. The resin separated in a few minutes. One half hour later heat was gradually applied and the slurry warmed to 70° during about 1.25 hours. After purification, the product was found to be acetalized to the extent of about 83%, i. e., 83% of the available hydroxyl groups had been reacted with aldehyde.

EXAMPLE 2

To a solution of 40 parts of high viscosity polyvinyl alcohol in 237 parts of water and 30.2 parts of methanol was added 0.8 part of sulfuric acid and 0.4 part of water-soluble methyl cellulose. The solution, at 22° C., was rapidly stirred while 30 grams of butyraldehyde was added. A few minutes later the resin separated in finely divided form. After one-half hour the slurry was warmed gradually to 70° C. The finished product was acetalized to the extent of about 78%.

EXAMPLE 3

Medium viscosity polyvinyl alcohol (42 parts) was dissolved in 660 parts of water containing 53.5 parts of methanol, and 1.05 parts of sulfuric acid. The solution was cooled to 26° C. and 0.43 part of gelatine in 3.3 parts of water and 39 parts of butyraldehyde were added. After stirring vigorously for a short time, the condensation product separated. The batch was stirred for 1.5 hours and then warmed to 70° during 52 minutes. After this temperature had been maintained for eight minutes, the product was cooled and filtered. Of the original hydroxyl groups 86% were found to be combined with the aldehyde.

EXAMPLE 4

A solution of polyvinyl alcohol, 43.5 parts, in 290 parts of water, containing sulfuric acid, 1.7 parts, was stirred vigorously at 17° C., and there was added to it butyraldehyde, 32.4 parts. Within a few minutes a resinous precipitate separated. Stirring was continued for one hour at the same temperature and then the batch was allowed to stand overnight. Then "Duponol" ME, 0.1 part, was added and the batch stirred and heated to 70° C., in one hour. The batch was then cooled, and the precipitate purified. The product was of uniformly small particle size. Analysis showed acetalization to be 78% complete.

EXAMPLE 5

The accelerating effect of "Duponol" ME upon the reaction of condensation is illustrated by a comparison of two runs, A and B, for which the data follow.

| | A | B |
|---|---|---|
| Dispersing agent | (¹) | (²) |
| Concentration of dispersing agent, as percentage of polyvinyl alcohol | 3 | 2.7 |
| H₂SO₄, as catalyst, per cent of polyvinyl alcohol | 3 | 3 |
| Butyraldehyde, percentage of theoretical for complete condensation | 99 | 99 |
| Starting temperature °C | 25 | 25 |
| Time at this temperature min | 30 | 30 |
| Time at 50° C do | 45 | 32 |
| Percentage of polyvinyl alcohol in product | 23.7 | 11.7 |

¹ Gelatine.
² "Duponol" ME.

EXAMPLE 6

A solution was prepared containing 244 parts of high-viscosity polyvinyl alcohol, 165 parts of methanol, 1475 parts of water, 6.5 parts of "Duponol" ME and 9.6 parts of hydrochloric acid. To this solution, at 30° C., was added 220 parts of approximately 95% pure butyraldehyde, and the mixture was stirred vigorously. After a short time a resin separated in a finely divided condition. The slurry was stirred for half an hour, and then gradually warmed to 57° C. The heating, which occupied about half an hour, was accompanied by vigorous agitation. At the end of this period, the slurry was cooled and diluted. The powdered resin was separated, washed and stabilized in the usual way. It dissolved readily in acetone, and was shown by analysis to be acetalized to the extent of about 84%, i. e., 84% of the available hydroxyl groups had been reacted with aldehyde.

EXAMPLE 7

A solution was prepared containing 43 parts of medium-viscosity polyvinyl alcohol, 55 parts of methanol, 1.08 parts of sulfuric acid and 1.13 parts of "Duponol" ME in 400 parts of water. While this solution was vigorously stirred at 23° C., 31.5 parts of butyraldehyde was added. The resinous product soon separated in a finely divided condition. The mixture was stirred for one hour, heated to 50° C. during one-half hour and kept at this temperature for one-half hour. The finished product was acetalized to the extent of 81%. The amount of aldehyde provided was sufficient, theoretically, to effect condensation of 85% of the hydroxyl groups.

EXAMPLE 8

Medium-viscosity polyvinyl alcohol, 44.6 parts, was dissolved in 415 parts of water containing 50.4 parts of methanol, 1.38 parts of sulfuric acid and 1.13 parts of "Duponol" ME. The solution was cooled to 23° C. and 31.5 parts of butyraldehyde were added with rapid stirring. About 15 or 20 minutes after the resin separated, a solution of 0.42 part of gelatine in water was added. After one hour from the start of the reaction the heat was applied and the temperature raised to 50° C. during one-half hour. After maintaining this temperature for an equal period of time, the batch was cooled and filtered. The finished product was acetalized to the extent of about 83%, which corresponds, within experimental error, to complete consumption of the aldehyde provided.

The use of two dispersing agents, as in this example, is for the purpose of securing the accelerating effect of "Duponol" ME and the favorable effect of gelatine upon the particle size of the product.

EXAMPLE 9

A solution containing 168 parts of high-viscosity polyvinyl alcohol, 107 parts of methanol, 1015 parts of water, 3.3 parts of sulfuric acid and 4.5 parts of "Duponol" ME was stirred at 23.5° C. and 92 parts of butyraldehyde was added. After about three minutes the reaction product separated in a finely divided condition. Stirring was continuous for about a quarter of an hour and 31 parts of butyraldehyde was added. Five minutes later 1.7 parts of gelatine dissolved in a little water was added and heat was applied. Prior to the addition of the gelatine, the particle size had increased somewhat. The gelatine, however, prevented any further substantial increase in size. During the next 100 minutes the temperature of the batch was gradually raised to 52° C. It was then cooled and the resin given the usual washing and purification.

Analysis indicated that about 83% of the hydroxyl groups of the polyvinyl alcohol had reacted with the aldehyde. The amount of aldehyde provided was sufficient, theoretically, to effect condensation of 85% of the hydroxyl groups.

EXAMPLE 10

A solution was prepared containing 43.5 parts of medium-viscosity polyvinyl alcohol, 59 parts of acetic, 1.13 parts of sulfuric acid and 1.13 parts of "Duponol" ME in 397.5 parts of water. The butyraldehyde (23.5 parts) was added to the rapidly stirred solution at 21° C. The resin separated in a short time. After agitating for one hour, 0.41 part of gelatine in water solution was added and the temperature was raised to 50° C. during one-half hour and maintained at this level for an equal period of time. The finished product showed about 26% of the hydroxyl groups still uncombined.

EXAMPLE 11

To a solution containing 80 parts of polyvinyl alcohol (high viscosity), 53 parts of methanol, 2.16 parts of "Duponol" ME and 64 parts of p-toluene sulphonic acid in 477 parts of water, all at 30° C., was added 69.5 parts of butyraldehyde. The mixture was rapidly stirred, and the condensation product separated in a few minutes. One-half hour later heat was gradually applied and the batch was warmed to about 50° C. during one-half hour. The resin was cooled and purified. Analysis indicated that about 81% of the hydroxyl groups had reacted with the aldehyde.

EXAMPLE 12

A solution containing 60 parts of high-viscosity polyvinyl alcohol, 48 parts of methanol, 2.16 parts of sulfuric acid, 2.4 parts of "Duponol" ME, and 350 parts of water was warmed to 50° C. and 52.4 parts of isobutyraldehyde was added with rapid stirring. The condensation product quickly separated in finely divided form. After continuous stirring for twenty minutes, the slurry was cooled and diluted, and the product was given the usual purification. Analysis showed that the resin was acetalized to the extent of about 76%.

EXAMPLE 13

A solution was prepared containing 50 parts of high-viscosity polyvinyl alcohol, 35 parts of methanol, 2 parts of sulfuric acid, 1.35 parts of "Duponol" ME and 300 parts of water. To the rapidly stirred solution at 25° C. was added 39.6 parts of propionaldehyde. In a few minutes the condensation product separated in granular form. The mixture was stirred for one-half hour and then warmed to 50° C. during an equal period of time. After purification the product was found to be acetalized to the extent of about 80%.

EXAMPLE 14

A solution was prepared containing 80 parts of a partially hydrolyzed polyvinyl acetate (containing 10% of vinyl acetate), 3.2 parts of sulfuric acid and 2.16 parts of "Duponol" ME in 720 parts of water. The solution was rapidly stirred and 60 parts of butyraldehyde was added. The condensation product separated shortly. Ten minutes later 0.8 part of gelatine, dissolved in a little water, was added. The reaction was allowed to proceed at room temperature for one-half hour. The slurry was gradually warmed to 50° C. during the second half-hour period, and kept at this temperature for an equal length of time. The finished resin was found to have 80% of the hydroxyl groups combined with the aldehyde.

EXAMPLE 15

To an agitated solution, at room temperature, consisting of polyvinyl alcohol, 80 parts, water, 530 parts, sulfuric acid, 3.2 parts, and "Alkanol" SA, 3 parts, was added commercial butyraldehyde, 69.5 parts. Under continued agitation, a resinous product soon precipitated in finely-divided form. After thirty minutes, heat was applied, with continued agitation, and the temperature thereby raised to 50° C. in thirty minutes. The batch was then cooled and the resin separated and purified. Condensation was found to be 77.5% complete.

EXAMPLE 16

A solution of polyvinyl alcohol, 55 parts, in 371 parts of water, with 2.2 parts of sulfuric acid and 1.65 parts of "Avirol" L-142, was stirred vigorously at 30° C. To it was added butyraldehyde, 41.2 parts, and agitation was continued. Within a short time a resinous precipitate appeared. The batch was then gradually heated to 80° C., and then cooled. The resinous product, purified in known manner, showed upon analysis the acetalization of 81% of the available hydroxyl.

In the following table is given the composition, by weight, of each polyvinyl acetal resin prepared in the examples:

Table

| Example No. | Polyvinyl acetate | Polyvinyl alcohol | Polyvinyl acetal |
|---|---|---|---|
|  | Per cent | Per cent | Per cent |
| 1 | 0.5 | 12.0 | 87.5 |
| 2 | 1.0 | 15.0 | 84.0 |
| 3 | 0.5 | 10.0 | 89.5 |
| 4 | 1.2 | 15.0 | 83.8 |
| 5A | 1.1 | 23.7 | 75.2 |
| 5B | 1.1 | 11.7 | 87.2 |
| 6 | 0.6 | 11.0 | 88.4 |
| 7 | 1.0 | 13.0 | 86.0 |
| 8 | 1.4 | 11.5 | 87.1 |
| 9 | 0.9 | 11.5 | 87.6 |
| 10 | 1.1 | 18.0 | 80.9 |
| 11 | 0.8 | 13.0 | 86.2 |
| 12 | 1.0 | 17.0 | 82.0 |
| 13 | 1.2 | 15.0 | 83.8 |
| 14 | 6.9 | 12.5 | 80.6 |
| 15 | 1.0 | 15.5 | 83.5 |
| 16 | 1.5 | 13.0 | 85.5 |

It will be understood that the above examples are merely illustrative and the invention broadly comprises adding, under agitation, a normally liquid aldehyde of low solubility in water to a water solution of polyvinyl alcohol at a temperature below 50° C., preferably between 20° C. and 30° C., in the presence of an acid catalyst; agitation of the reaction mixture is then continued while an intermediate polyvinyl acetal resin is precipitated in finely divided form and agitation is further continued and the reaction mixture is heated to a temperature above 50° C. in the presence of a dispersing agent normally added at the start of the process, until the reaction of condensation between the polyvinyl alcohol and the aldehyde has proceeded to the desired end-point.

The process of the present invention is particularly adapted for reacting polyvinyl alcohol with aliphatic aldehydes of three to five carbon atoms, inclusive, and employing as the dispersing agent either gelatine or a long-chain aliphatic alcohol sulphate, preferably, an alkali metal salt of a monoalkyl sulfuric acid ester in which the alkyl group is derived from long-chain normal primary aliphatic alcohols, such as "Duponol" ME and "Avirol" L-142 heretofore mentioned.

The principal advantages of the process of this invention lie in the elimination of the use of organic solvents and of the necessity of a special step of precipitation. Furthermore, the use of this method makes it possible to prepare a desired polyvinyl acetal with the use of only a slight excess of an aldehyde above that theoretically required. These improvements obviously make for economy.

In addition, acetals of an unusually high degree of acetalization can be readily prepared, which by older procedures could not practicably be prepared because of the large excesses of aldehyde required. The degree to which the condensation reaction proceeds in the presence of large amounts of water is unexpected in view of the fact that water is one of the products of the condensation.

As many apparently widely different embodiments of this invention may be made without departing from the spirit and scope thereof, it is to be understood that the invention is not limited to the specific embodiments thereof except as defined in the appended claims.

I claim:

1. Process of preparing a polyvinyl acetal resin which comprises adding, under agitation, a normally liquid saturated aliphatic aldehyde of no greater solubility in water than propionaldehyde to a water solution of polyvinyl alcohol at a temperature below 50° C. in the presence of an acid catalyst, continuing said agitation while an intermediate polyvinyl acetal resin is precipitated in finely divided form, and further continuing said agitation and heating said reaction mixture in the presence of a dispersing agent to a temperature above 50° C. until the reaction of condensation between said polyvinyl alcohol and said aldehyde has proceeded to the desired end-point.

2. Process of preparing a polyvinyl acetal resin which comprises adding, under agitation, a normally liquid saturated aliphatic aldehyde of no greater solubility in water than propionaldehyde to a water solution of polyvinyl alcohol at 20° C.–30° C. in the presence of an acid catalyst, continuing said agitation while an intermediate polyvinyl acetal resin is precipitated in finely divided form, and further continuing said agitation and heating said reaction mixture in the presence of a dispersing agent to a temperature above 50° C. until the reaction of condensation between said polyvinyl alcohol and said aldehyde has proceeded to the desired end-point.

3. Process of preparing a polyvinyl acetal resin which comprises adding, under agitation, a saturated aliphatic aldehyde containing three to five carbon atoms, inclusive, to a water solution of polyvinyl alcohol at a temperature below 50° C. in the presence of an acid catalyst and a dispersing agent, continuing said agitation while an intermediate polyvinyl acetal resin is precipitated in finely divided form, and further continuing said agitation and heating said reaction mixture to a temperature above 50° C. until the reaction of condensation between said polyvinyl alcohol and said aldehyde has proceeded to the desired end-point.

4. Process of preparing a polyvinyl acetal resin which comprises adding, under agitation, a saturated aliphatic aldehyde containing three to five carbon atoms, inclusive, to a water solution of polyvinyl alcohol at 20° C.–30° C. in the presence of an acid catalyst and a dispersing agent, continuing said agitation while an intermediate polyvinyl acetal resin is precipitated in finely divided form, and further continuing said agitation and heating said reaction mixture to a temperature above 50° C. until the reaction of condensation between said polyvinyl alcohol and said aldehyde has proceeded to the desired end-point.

5. Process of preparing a polyvinyl acetal resin which comprises adding, under agitation, a saturated aliphatic aldehyde containing three to five carbon atoms, inclusive, to a water solution of polyvinyl alcohol at a temperature below 50° C. in the presence of an acid catalyst and gelatine as a dispersing agent, continuing said agitation while an intermediate polyvinyl acetal resin is precipitated in finely divided form, and further continuing said agitation and heating said reaction mixture to a temperature above 50° C. until the reaction of condensation between said polyvinyl alcohol and said aldehyde has proceeded to the desired end-point.

6. Process of preparing a polyvinyl acetal resin which comprises adding, under agitation, a saturated aliphatic aldehyde containing three to five carbon atoms, inclusive, to a water solution of polyvinyl alcohol at a temperature below 50° C.

in the presence of an acid catalyst and an alkali metal salt of a monoalkyl sulfuric acid ester in which the alkyl group is derived from long-chain normal primary aliphatic alcohols, continuing said agitation while an intermediate polyvinyl acetal resin is precipitated in finely divided form, and further continuing said agitation and heating said reaction mixture to a temperature above 50° C. until the reaction of condensation between said polyvinyl alcohol and said aldehyde has proceeded to the desired end-point.

7. Process of preparing a polyvinyl acetal resin which comprises adding, under agitation, a saturated aliphatic aldehyde containing three to five carbon atoms, inclusive, to a water solution of polyvinyl alcohol at a temperature below 50° C. in the presence of an acid catalyst and gelatine as a dispersing agent and an alkali metal salt of a monoalkyl sulfuric acid ester in which the alkyl group is derived from long-chain normal primary aliphatic alcohols, as an accelerative agent, continuing said agitation while an intermediate polyvinyl acetal resin is precipitated in finely divided form, and further continuing said agitation and heating said reaction mixture to a temperature above 50° C. until the reaction of condensation between said polyvinyl alcohol and said aldehyde has proceeded to the desired end-point.

8. Process of preparing a polyvinyl butyral resin which comprises adding, under agitation, butyraldehyde to a water solution of polyvinyl alcohol at a temperature below 50° C. in the presence of an acid catalyst and a dispersing agent, continuing said agitation while an intermediate polyvinyl butyral resin is precipitated in finely divided form, and further continuing said agitation and heating said reaction mixture to a temperature above 50° C. until the reaction of condensation between said polyvinyl alcohol and said butyraldehyde has proceeded to the desired end-point.

9. Process of preparing a polyvinyl butyral resin which comprises adding, under agitation, butyraldehyde to a water solution of polyvinyl alcohol at 20° C.–30° C. in the presence of an acid catalyst and gelatine as a dispersing agent, continuing said agitation while an intermediate polyvinyl butyral resin is precipitated in finely divided form, and further continuing said agitation and heating said reaction mixture to 50° C.–75° C. until the reaction of condensation between said polyvinyl alcohol and said butyraldehyde has proceeded to the desired end-point.

10. Process of preparing a polyvinyl butyral resin which comprises adding, under agitation, butyraldehyde to a water solution of polyvinyl alcohol at 20° C.–30° C. in the presence of an acid catalyst and an alkali metal salt of a monoalkyl sulfuric acid ester in which the alkyl group is derived from long-chain normal primary aliphatic alcohols, continuing said agitation while an intermediate polyvinyl butyral resin is precipitated in finely divided form, and further continuing said agitation and heating said reaction mixture to 50° C.–75° C. until the reaction of condensation between said polyvinyl alcohol and said butyraldehyde has proceeded to the desired end-point.

11. Process of preparing a polyvinyl butyral resin which comprises adding, under agitation, butyraldehyde to a water solution of polyvinyl alcohol at 20° C.–30° C. in the presence of an acid catalyst and gelatine as a dispersing agent and an alkali metal salt of a monoalkyl sulfuric acid ester in which the alkyl group is derived from long-chain normal primary aliphatic alcohols, as an accelerative agent, continuing said agitation while an intermediate polyvinyl butyral resin is precipitated in finely divided form, and further continuing said agitation and heating said reaction mixture to 50° C.–75° C. until the reaction of condensation between said polyvinyl alcohol and said butyraldehyde has proceeded to the desired end-point.

12. Process of preparing a polyvinyl acetal resin which comprises adding, under agitation, a saturated aliphatic aldehyde containing 3 to 5 carbon atoms, inclusive, to a water solution of polyvinyl alcohol at a temperature below 50° C. in the presence of an acid catalyst and 0.2%–1.0%, by weight of said polyvinyl alcohol, of a dispersing agent, and further continuing said agitation and heating said reaction mixture to a temperature above 50° C. until the reaction of condensation between said polyvinyl alcohol and said aldehyde has proceeded to the desired end-point.

13. Process of preparing a polyvinyl butyral resin which comprises adding, under agitation, butyraldehyde to a water solution of polyvinyl alcohol at a temperature below 50° C. in the presence of an acid catalyst and 0.2%–1.0%, by weight of said polyvinyl alcohol, of a dispersing agent, and further continuing said agitation and heating said reaction mixture to a temperature above 50° C. until the reaction of condensation between said polyvinyl alcohol and said butyraldehyde has proceeded to the desired end-point.

SIDNEY C. OVERBAUGH.